(12) United States Patent
Li et al.

(10) Patent No.: US 11,939,230 B1
(45) Date of Patent: Mar. 26, 2024

(54) METAL SULFIDE NEGATIVE MATERIAL OF SODIUM ION BATTERY AND PREPARATION METHOD THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Aixia Li, Guangdong (CN); Haijun Yu, Guangdong (CN); Yinghao Xie, Guangdong (CN); Xuemei Zhang, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/265,872

(22) PCT Filed: Aug. 11, 2022

(86) PCT No.: PCT/CN2022/111807
§ 371 (c)(1),
(2) Date: Jun. 7, 2023

(87) PCT Pub. No.: WO2023/071394
PCT Pub. Date: May 4, 2023

(30) Foreign Application Priority Data

Oct. 28, 2021 (CN) .......................... 202111259839.3

(51) Int. Cl.
| | |
|---|---|
| H01M 4/58 | (2010.01) |
| C01G 3/12 | (2006.01) |
| C01G 9/08 | (2006.01) |
| H01M 10/054 | (2010.01) |
| H01M 4/02 | (2006.01) |

(52) U.S. Cl.
CPC ................ *C01G 3/12* (2013.01); *C01G 9/08* (2013.01); *H01M 4/5815* (2013.01); *H01M 10/054* (2013.01); *C01P 2004/03* (2013.01); *C01P 2004/62* (2013.01); *C01P 2004/64* (2013.01); *C01P 2004/82* (2013.01); *C01P 2006/40* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2020/0153032 A1  5/2020  Yuk et al.

FOREIGN PATENT DOCUMENTS

| CN | 107069001 A | 8/2017 | |
|---|---|---|---|
| CN | 107317070 A | * 11/2017 | ............ H01M 12/08 |
| CN | 108288693 A | 7/2018 | |
| CN | 109279647 A | * 1/2019 | ............ B82Y 30/00 |
| CN | 110289416 A | 9/2019 | |
| CN | 110323428 A | 10/2019 | |
| CN | 113428890 A | 9/2021 | |
| CN | 114229884 A | 3/2022 | |
| CN | 114229884 B | 5/2023 | |
| WO | 2016/134765 A1 | 9/2016 | |

OTHER PUBLICATIONS

Notification to Grant the Right to Invention issued by the State Intellectual Property Office of People's Republic of China for Chinese Patent Application No. 202111259839.3, dated Feb. 24, 2023, with an English translation.
International Search Report and Written Opinion of the International Searching Authority issued by the China National Intellectual Property Administration for International Patent Application No. PCT/CN2022/111807, dated Oct. 27, 2022, with an English translation.
First Office Action and Search Report issued by the State Intellectual Property Office of People's Republic of China for Chinese Patent Application No. 202111259839.3, dated Dec. 5, 2022, with an English translation.
Su et al., "Improved Electrochemical Performance of Na-Ion Batteries in Ether-Based Electrolytes: A Case Study of ZnS Nanospheres", Advanced Energy Materials, 2016, p. 1501785, No. 6, Wiley—VCN, Germany.

* cited by examiner

*Primary Examiner* — Tanisha Diggs
(74) *Attorney, Agent, or Firm* — MYERS WOLIN, LLC

(57) ABSTRACT

A metal sulfide negative material of a sodium ion battery and a preparation method thereof. The material has porous nanoparticles with a particle size of 5 nm to 500 nm, and the metal sulfide negative material of the sodium ion battery is at least one of zinc sulfide or copper sulfide. The preparation method includes the steps of preparing a mixed solution of stannous chloride and metal salt, adding polyvinylpyrrolidone into the mixed solution to obtain a solution A, introducing reaction gas into the solution A, aging after the reaction to obtain a precipitate, and soaking the precipitate in a persulfide solution to obtain the metal sulfide sodium ion battery negative material.

9 Claims, 1 Drawing Sheet

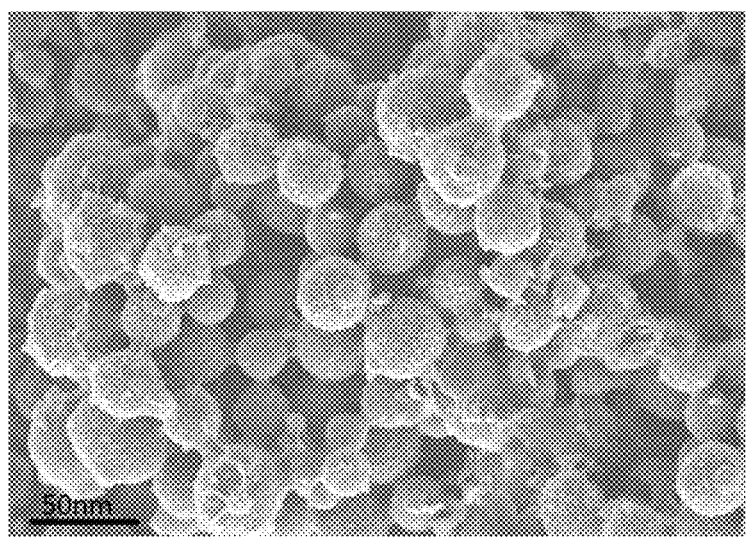

METAL SULFIDE NEGATIVE MATERIAL OF SODIUM ION BATTERY AND PREPARATION METHOD THEREOF

CROSS-REFERENCE TO RELATED APPLICATION

This application is a national stage filing under 35 U.S.C. § 371 of international application number PCT/CN2022/111807, filed Aug. 11, 2022, which claims priority to Chinese patent application No. 202111259839.3 filed Oct. 28, 2021. The contents of these applications are incorporated herein by reference in their entirety.

TECHNICAL FIELD

The present disclosure belongs to the technical field of sodium ion batteries, and particularly relates to a metal sulfide negative material of a sodium ion battery and a preparation method thereof.

BACKGROUND

Negative materials are one of the key factors affecting the electrochemical performances of sodium ion batteries. However, when graphite widely used in commercial lithium ion batteries is used as the negative material of the sodium ion battery, the sodium storage capacity of the sodium ion battery is low (35 mAh/g) and the cycle stability of the sodium ion battery is poor. This is mainly because that the radius (0.102 nm) of sodium ions is larger than that of lithium ions (0.076 nm), and the intercalation/deintercalation process of the sodium ions between graphite layers easily destroys the structure of the graphite. It is urgent for us to find other suitable negative materials for the sodium ion batteries. Metal oxides and metal sulfides are widely used negative materials for sodium ion batteries at present. Compared with the metal oxides, the reversible deintercalation process and cycle stability of the sulfides are both higher. Because the metal sulfur bonds in the metal sulfides are more conducive to a conversion reaction, the metal sulfides are conducive to the storage of sodium.

In recent years, due to the high theoretical capacity, the metal sulfides have attracted extensive attention as negative materials for the sodium ion batteries. Moreover, the metal sulfides have some unique advantages when used as sodium storage materials. 1. The metal sulfides belong to layered structure materials and are easy to form two-dimensional laminated structures. 2. The Van der Waals force between the metal sulfide layers is weak, which inhibits the metal sulfide layers to stack in the direction of a c axis, thus reducing the thickness of the material and thus shortening the diffusion distance of $Na^+$. 3. The metal sulfides have large interlayer spacing, which is conducive to the diffusion of $Na^+$ between the metal sulfide layers.

The laminated transition metal sulfides have attracted the attention and favor of many researchers due to high conductivity, high theoretical specific capacity and suitable redox potential thereof, as well as advantages thereof in mechanical stability, thermodynamic stability and structural stability. Many transition metal sulfides have been reported as negative materials one after another. Laminated disulfide usually undergoes a $Na^+$ deintercalation reaction at high potentials, and then undergoes a conversion reaction at low potentials, generating metal elements M and $Na_2S$, wherein some material, such as $SnS_2$, also undergoes an alloying reaction at lower potentials.

However, the low conductivity of the laminated metal sulfides and the large volume change (about 340%) during the process of charging and discharging often lead to poor cycle performances.

SUMMARY

The present disclosure aims at solving at least one of the above-mentioned technical problems in the existing technology. Therefore, the present disclosure provides a metal sulfide negative material of a sodium ion battery and a preparation method thereof.

According to one aspect of the present disclosure, a metal sulfide negative material of a sodium ion battery is proposed. The material has porous nanoparticles with a particle size of 5 nm to 500 nm, and the metal sulfide negative material of the sodium ion battery is at least one of zinc sulfide or copper sulfide.

The present disclosure further provides a preparation method of the metal sulfide negative material of the sodium ion battery, including the following steps of:
S1: preparing a mixed solution of stannous chloride and metal salt, wherein the metal salt is at least one of zinc salt or copper salt;
S2: adding polyvinylpyrrolidone into the mixed solution to obtain a solution A;
S3: introducing reaction gas into the solution A, wherein the reaction gas is a mixed gas of hydrogen sulfide and nitrogen, aging after the reaction, and performing solid-liquid separation to obtain a precipitate; and
S4: soaking the precipitate into a persulfide solution, and performing solid-liquid separation, then washing and drying an obtained solid, thus obtaining the metal sulfide negative material of the sodium ion battery; wherein the persulfide solution is a solution of one or two of sodium persulfate and ammonium persulfate.

In some embodiments of the present disclosure, in step S1, a pH of the mixed metal salt solution is less than or equal to 1.

In some embodiments of the present disclosure, wherein in step S1, a concentration of the stannous chloride in the mixed solution ranges from 0.01 mol/L to 1 mol/L, and a metal ion concentration of the metal salt ranges from 0.1 mol/L to 2 mol/L.

In some embodiments of the present disclosure, in step S1, the metal salt is at least one of copper chloride, zinc chloride, copper sulfate, or zinc sulfate.

In some embodiments of the present disclosure, in step S2, a concentration of the polyvinylpyrrolidone in the solution A ranges from 5 g/L to 20 g/L.

In some embodiments of the present disclosure, in step S2, the polyvinylpyrrolidone is at least one of K30 or K60.

In some embodiments of the present disclosure, in step S3, a volume ratio of the hydrogen sulfide to the nitrogen is (0.001 to 1):1; and a flow rate of the mixed gas is 1 times to 5 times of a volume of the solution A per hour.

In some embodiments of the present disclosure, in step S3, the aging lasts for 1 hour to 48 hours.

In some embodiments of the present disclosure, in step S4, a concentration of the persulfide solution ranges from 0.1 mol/L to 1 mol/L; and the soaking lasts for 1 hour to 24 hours.

In some embodiments of the present disclosure, in step S4, when the solid does not contain copper, after washing and drying, the solid is further carbonized as follows: adding the solid into a carbon source solution for hydrothermal reaction, and performing thermal treatment in an inert atmosphere after the reaction, thus obtaining the metal sulfide negative material of the sodium ion battery. Through the carbonization treatment, a supporting carbon skeleton structure is formed inside and outside the particle, thus further improving the strength and conductivity of the particle.

In some embodiments of the present disclosure, in step S4, the washing is to wash with deionized water first and then wash with ethanol or acetone.

In some embodiments of the present disclosure, in step S4, the drying is vacuum drying and performed at a temperature of 50° C. to 80° C., and the drying lasts for 2 hours to 12 hours.

In some embodiments of the present disclosure, in step S4, a concentration of the carbon source solution ranges from 0.05 g/mL to 2 g/mL; and the carbon source in the carbon source solution is at least one of glucose, starch, sucrose, fructose, lactose or galactose.

In some embodiments of the present disclosure, in step S4, the thermal treatment is performed at a temperature of 200° C. to 550° C.; and the thermal treatment lasts for 1 hour to 12 hours.

In some embodiments of the present disclosure, in step S4, a solid-liquid ratio of the solid to the carbon source solution is 1 g:(1 to 10) mL.

In some embodiments of the present disclosure, in step S4, the hydrothermal reaction is performed at a temperature of 150° C. to 200° C., and the reaction lasts for 2 hours to 5 hours.

According to a preferred embodiment of the present disclosure, the present disclosure has at least the following beneficial effects.

1. According to the present disclosure, after the salt solutions of zinc and copper is mixed with the stannous chloride, coprecipitation is realized under the action of the hydrogen sulfide to prepare eutectic nanoparticles of stannous sulfide and zinc sulfide/copper sulfide, and the particles are soaked in sodium persulfate/ammonium persulfate to remove the stannous sulfide, leaving only the zinc sulfide/copper sulfide in the particles, thus obtaining the porous nanoparticles. The sodium persulfate/ammonium persulfate is used to dissolve the stannous sulfide, and the reaction equation is: $SnS+(NH_4)_2S_2 \rightarrow (NH_4)_2SnS_3$.

2. By adding the polyvinylpyrrolidone, the present disclosure plays a role of co-complexing the metal ions, so that $Sn^{2+}$ and $Zn^{2+}/Cu^{2+}$ achieve the purpose of co-precipitation, and the yield of the precipitation reaction is slowed down, so that the crystallinity of the material is better. In order to avoid the hydrolysis of the stannous chloride and increase the solubility of the stannous chloride, it is preferable to prepare the mixed solution at a lower pH.

3. The mixed gas of hydrogen sulfide and nitrogen is used as the reaction gas to further control the concentration of the hydrogen sulfide, thereby controlling the rate of the precipitation reaction and making the crystallinity of the material better.

4. The negative material is nano-scale and has a porous structure, and in the process of charging and discharging, the internal porous structure of the negative material cannot only buffer a volume change caused in the process of charging and discharging, but also increase a contact area between an electrode and an electrolyte, and has high capacity and excellent cycle and rate performances.

BRIEF DESCRIPTION OF DRAWINGS

The present disclosure will be further explained with reference to the accompanying drawings and embodiments hereinafter, wherein:

FIG. 1 is an SEM graph of a negative material having porous CuS nanoparticles prepared in Embodiment 1 of the present disclosure.

DETAILED DESCRIPTION

The concepts and the technical effects produced of the present disclosure will be clearly and completely described in conjunction with the embodiments so as to sufficiently understand the objects, the features and the effects of the present disclosure. Obviously, the described embodiments are merely some embodiments of the disclosure, rather than all the embodiments. Other embodiments obtained by those skilled in the art without going through any creative effort shall all fall within the protection scope of the disclosure.

Embodiment 1

In this embodiment, a CuS negative material of a sodium ion battery was prepared. As shown in FIG. 1, the appearance of the negative material had porous nanoparticles with a particle size of nm to 50 nm. The specific preparation process was as follows:

(1) preparing a mixed solution of stannous chloride and copper chloride, wherein a pH of the mixed solution was less than or equal to 1, a concentration of the stannous chloride was 0.05 mol/L, and a concentration of the copper chloride was 0.5 mol/L;

(2) adding polyvinylpyrrolidone –K30 into the mixed solution to obtain a solution A, wherein a concentration of the polyvinylpyrrolidone in the solution A was 10 g/L;

(3) under constant stirring, introducing reaction gas into the solution A, wherein the reaction gas was a mixed gas of hydrogen sulfide and nitrogen, a volume ratio of the hydrogen sulfide to the nitrogen was 0.01:1, and a flow rate of the reaction gas was 3 times of a volume of the solution A per hour;

(4) after the reaction was completed, stopping introducing the reaction gas, aging for 24 hours, and performing solid-liquid separation to collect a precipitate;

(5) soaking the precipitate into 0.5 mol/L sodium persulfate solution for 24 hours, after solid-liquid separation, washing the solid with deionized water and then washing with acetone; and (6) after washing, performing vacuum drying at 60° C. for 8 hours to prepare the porous CuS nanoparticles as the negative material of the sodium ion battery.

Embodiment 2

In this embodiment, a ZnS negative material of a sodium ion battery was prepared. The appearance of the negative material had porous nanoparticles with a particle size of 50 nm to 80 nm. The specific preparation process was as follows:

(1) preparing a mixed solution of stannous chloride and zinc chloride, wherein a pH of the mixed solution was less than or equal to 1, a concentration of the stannous chloride was 0.01 mol/L, and a concentration of the zinc chloride was 1 mol/L;

(2) adding polyvinylpyrrolidone –K60 into the mixed solution to obtain a solution A, wherein a concentration of the polyvinylpyrrolidone in the solution A was 15 g/L;

(3) under constant stirring, introducing reaction gas into the solution A, wherein the reaction gas was a mixed gas of hydrogen sulfide and nitrogen, a volume ratio of the hydrogen sulfide to the nitrogen was 0.05:1, and a flow rate of the reaction gas was 2 times of a volume of the solution A per hour;

(4) after the reaction was completed, stopping introducing the reaction gas, aging for 48 hours, and performing solid-liquid separation to collect a precipitate;

(5) soaking the precipitate into 1 mol/L ammonium persulfate solution for 12 hours, after solid-liquid separation, washing the solid with deionized water and then washing with acetone;

(6) after washing, performing vacuum drying at 60° C. for 8 hours; and (7) after drying, adding the solid into 2 g/mL glucose solution for hydrothermal reaction, wherein the hydrothermal reaction was performed at a solid-liquid ratio of 1 g:1 mL and a reaction temperature of 200° C., and lasted for 2 hours, and after the reaction was finished, reacting for 5 hours at 500° C. in an inert atmosphere to obtain the negative material of the sodium ion battery with a chemical formula of ZnS/C.

Embodiment 3

In this embodiment, a CuS—ZnS negative material of a sodium ion battery was prepared. The appearance of the negative material had porous nanoparticles with a particle size of 40 nm to 60 nm. The specific preparation process was as follows:

(1) preparing a mixed solution of stannous chloride, copper chloride and zinc chloride, wherein a pH of the mixed solution was less than or equal to 1, a concentration of the stannous chloride was 0.05 mol/L, and concentrations of the copper chloride and the zinc chloride were both 0.5 mol/L;

(2) adding polyvinylpyrrolidone -K30 into the mixed solution to obtain a solution A, wherein a concentration of the polyvinylpyrrolidone in the solution A was 20 g/L;

(3) under constant stirring, introducing reaction gas into the solution A, wherein the reaction gas was a mixed gas of hydrogen sulfide and nitrogen, a volume ratio of the hydrogen sulfide to the nitrogen was 0.02:1, and a flow rate of the reaction gas was 1 times of a volume of the solution A per hour;

(4) after the reaction was completed, stopping introducing the reaction gas, aging for 24 hours, and performing solid-liquid separation to collect a precipitate;

(5) soaking the precipitate into 0.5 mol/L sodium persulfate solution for 24 hours, after solid-liquid separation, washing the solid with deionized water and then washing with acetone; and (6) after washing, performing vacuum drying at 80° C. for 2 hours to prepare the porous CuS—ZnS nanoparticles as the negative material of the sodium ion battery.

EXPERIMENT

The negative materials of the sodium ion batteries prepared in Embodiments 1 to 3 and the corresponding sulfides were used to prepare negative plates of sodium ion batteries respectively and assembled into button batteries, which were tested under a current density of 100 mA/g and a voltage range of 0.4 V to 2.6 V. The results were shown in Table 1.

TABLE 1

| Embodiments | Capacity per gram mAh/g after first charging and discharging | Capacity per gram mAh/g after $100^{th}$ charging and discharging |
|---|---|---|
| Embodiment 1 | 435.1 | 421.6 |
| Embodiment 2 | 546.7 | 533.7 |
| Embodiment 3 | 450.5 | 438.3 |
| Comparative Examples | Capacity per gram mAh/g after first charging and discharging | Capacity per gram mAh/g after $50^{th}$ charging and discharging |
| Copper sulfide | 415.6 | 392.9 |
| Zinc sulfide | 510.8 | 481.7 |

The embodiments of the present disclosure are described in detail with reference to the drawings above, but the present disclosure is not limited to the above embodiments, and various changes may also be made within the knowledge scope of those of ordinary skills in the art without departing from the purpose of the present disclosure. In addition, in case of no conflict, the embodiments in the application and the features in the embodiments may be combined with each other.

The invention claimed is:

1. A preparation method of a metal sulfide negative material of a sodium ion battery, comprising the following steps of:
   S1: preparing a mixed solution of stannous chloride and metal salt, wherein the metal salt is at least one of zinc salt or copper salt;
   S2: adding polyvinylpyrrolidone into the mixed solution to obtain a solution A;
   S3: introducing reaction gas into the solution A, wherein the reaction gas is a mixed gas of hydrogen sulfide and nitrogen, aging after the reaction, and performing solid-liquid separation to obtain a precipitate; and
   S4: soaking the precipitate into a persulfide solution, and performing solid-liquid separation, then washing and drying an obtained solid, thus obtaining the metal sulfide negative material of the sodium ion battery; wherein the persulfide solution is a solution of one or two of sodium persulfate and ammonium persulfate;
   wherein the metal sulfide negative material of the sodium ion battery has porous nanoparticles with a particle size of 5 nm to 500 nm, and the metal sulfide negative material of the sodium ion battery is at least one of zinc sulfide or copper sulfide.

2. The preparation method according to claim 1, wherein in step S1, a concentration of the stannous chloride in the mixed solution ranges from 0.01 mol/L to 1 mol/L, and a metal ion concentration of the metal salt ranges from 0.1 mol/L to 2 mol/L.

3. The preparation method according to claim 1, wherein in step S1, the metal salt is at least one of copper chloride, zinc chloride, copper sulfate, or zinc sulfate.

4. The preparation method according to claim 1, wherein in step S2, a concentration of the polyvinylpyrrolidone in the solution A ranges from 5 g/L to 20 g/L.

5. The preparation method according to claim 1, wherein in step S3, a volume ratio of the hydrogen sulfide to the nitrogen is (0.001 to 1):1; and a flow rate of the mixed gas is 1 times to 5 times of a volume of the solution A per hour.

6. The preparation method according to claim 1, wherein in step S4, a concentration of the persulfide solution ranges from 0.1 mol/L to 1 mol/L; and the soaking lasts for 1 hour to 24 hours.

7. The preparation method according to claim 1, wherein in step S4, when the solid does not contain copper, after washing and drying, the solid is further carbonized as follows: adding the solid into a carbon source solution for hydrothermal reaction, and performing thermal treatment in an inert atmosphere after the reaction, thus obtaining the metal sulfide negative material of the sodium ion battery.

8. The preparation method according to claim 7, wherein in step S4, a concentration of the carbon source solution ranges from 0.05 g/mL to 2 g/mL; and the carbon source in the carbon source solution is at least one of glucose, starch, sucrose, fructose, lactose or galactose.

9. The preparation method according to claim 7, wherein in step S4, the thermal treatment is performed at a temperature of 200° C. to 550° C.; and the thermal treatment lasts for 1 hour to 12 hours.

\* \* \* \* \*